(12) United States Patent
Lee et al.

(10) Patent No.: US 6,672,522 B2
(45) Date of Patent: Jan. 6, 2004

(54) WIND POWER GENERATING SYSTEM

(76) Inventors: Koo Shik Lee, 340-1, Jangan-Dong, Dongdaemoon-Ku, Seoul (KR); Dae Hoon Lee, 340-1, Jangan-Dong, Dongdaemoon-Ku, Seoul (KR)

( * ) Notice: Subject to any disclaimer, the term of this patent is extended or adjusted under 35 U.S.C. 154(b) by 108 days.

(21) Appl. No.: 10/084,196

(22) Filed: Feb. 28, 2002

(65) Prior Publication Data

US 2003/0160458 A1 Aug. 28, 2003

(51) Int. Cl.$^7$ ................................................ F03D 5/00
(52) U.S. Cl. ............................ 240/55; 240/44; 416/17
(58) Field of Search ............................. 290/55, 44, 43, 290/54; 416/4, 8, 17

(56) References Cited

U.S. PATENT DOCUMENTS

| | | | | |
|---|---|---|---|---|
| 3,504,988 A | * | 4/1970 | Stenner .......................... | 416/9 |
| 3,730,643 A | * | 5/1973 | Davison ......................... | 416/8 |
| 4,186,314 A | * | 1/1980 | Diggs ............................ | 290/55 |
| 4,494,008 A | * | 1/1985 | Patton ........................... | 290/44 |
| 4,527,950 A | * | 7/1985 | Biscomb ....................... | 416/117 |
| 4,589,344 A | * | 5/1986 | Davison ........................ | 104/24 |
| 4,832,569 A | * | 5/1989 | Samuelsen et al. ............ | 416/17 |
| 5,134,305 A | * | 7/1992 | Senehi .......................... | 290/55 |

* cited by examiner

*Primary Examiner*—Nicholas Ponomarenko
(74) *Attorney, Agent, or Firm*—Jones, Tullar & Cooper, P.C.

(57) ABSTRACT

Disclosed is a wind power generating system. The system comprises moving bodies connected one with another by connectors and repeatedly circulated on a rail of an endless track; sail devices rotatably mounted to the moving bodies and exposed to wind, each sail device having a sail and a mast and including a rotating mechanism for rotating the mast; geared members affixed to one sides of the moving bodies; a generator having a gear which is meshed with the geared members and thereby rotated to allow the generator to generate electricity; direction changing devices located at both turnaround portions of the rail; and sail direction adjusting devices each for adjusting a direction of the sail in conformity with a direction of wind stream.

3 Claims, 7 Drawing Sheets

WIND POWER GENERATING SYSTEM

BACKGROUND OF THE INVENTION

1. Field of the Invention

The present invention relates to a wind power generating system for generating electric energy using wind energy, and more particularly, the present invention relates to a wind power generating system which is simplified in its construction to reduce equipment and installation costs and is configured in such a way as to minimize a wind power loss and thereby maximize an electricity generation efficiency.

2. Description of the Related Art

A disadvantage caused upon generating electricity using wind power resides in the fact that, since a speed and a velocity of wind stream are frequently changed and the wind stream itself is not continuously maintained, a number of techniques are required to transform wind energy into electric energy, and accordingly, the conventional wind power generating system for conducting the transformation task cannot but be very expensive.

Also, because the conventional wind power generating system exhibits a high efficiency only where wind is sufficiently strong, restrictions are imposed on an installation place.

Further, an amount of electricity generated in one system is so small that several wind power generating systems must be installed in the same area. Consequently, a great deal of equipment and installation costs are incurred.

SUMMARY OF THE INVENTION

Accordingly, the present invention has been made in an effort to solve the problems occurring in the related art, and an object of the present invention is to provide a wind power generating system which is configured to have improved durability and can efficiently generate electricity even when a speed and a direction of wind stream are changed.

In order to achieve the above object, according to one aspect of the present invention, there is provided a wind power generating system comprising: moving bodies connected one with another by connectors and repeatedly circulated on a rail of an endless track; sail devices rotatably mounted to the moving bodies and exposed to wind, each sail device having a sail and a mast and including a rotating mechanism for rotating the mast; geared members affixed to one sides of the moving bodies; a generator having a gear which is meshed with the geared members and thereby rotated to allow the generator to generate electricity; direction changing devices located at both turnaround portions of the rail; and sail direction adjusting devices each for adjusting a direction of the sail in conformity with a direction of wind stream.

According to another aspect of the present invention, each sail device comprises a center shaft fastened to an upper surface of an associated moving body, a mast rotatably fitted around the center shaft, an upper transverse rod secured to an upper end of the mast, a sail fixed at an upper end thereof to the upper transverse rod, and a lower transverse rod to which a lower end of the sail is fixed.

According to still another aspect of the present invention, the system further comprises sail unfurling devices; and each sail unfurling device comprises a motor placed at a middle portion of the lower transverse rod in a manner such that both ends of an output shaft of the motor are integrally connected with the lower transverse rod, a support plate for supporting the motor, a guide tube fitted around the mast for ensuring that the support plate is moved upward and downward while being held horizontal, and reinforcing columns fastened to an upper surface of a rotation member, for preventing unintentional rotation of the support plate.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
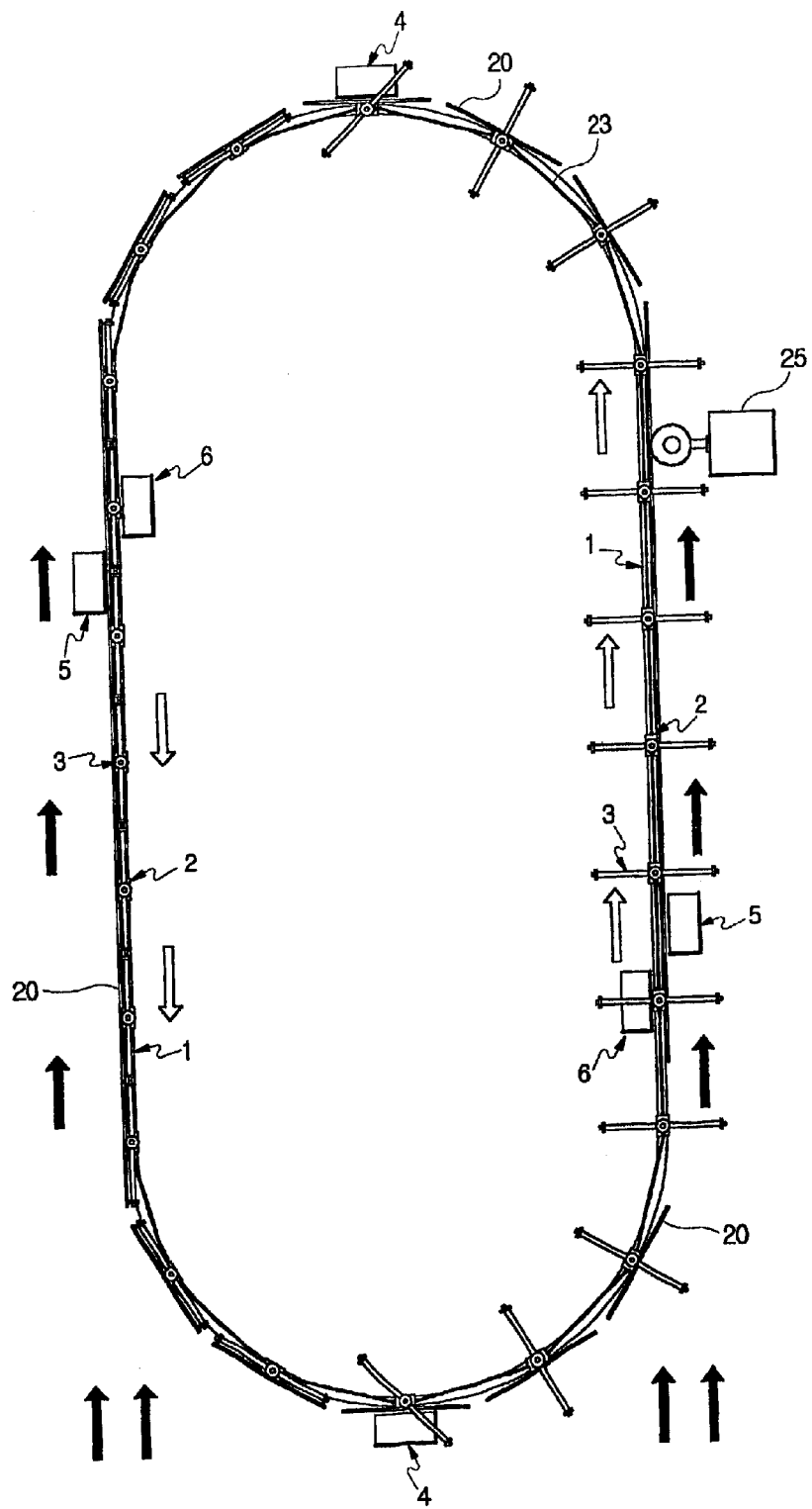
FIG. 1 is a plan view illustrating a wind power generating system in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

As shown in FIGS. 1 through 7, a wind power generating system in accordance with an embodiment of the present invention includes moving bodies 2. The moving bodies 2 are connected one with another by connectors 23 and repeatedly circulated on a rail 1 which defines an endless loop. A sail device 3 which is exposed to wind is rotatably mounted to each moving body 2. Geared members 20 are affixed to one sides of the moving bodies 2, respectively. Adjacent to a side of the rail 1, a generator 25 is positioned. The generator 25 has a gear which is meshed with the geared members 20. By this fact, the generator 25 can generate electricity through rotation of its gear, which rotation is induced by movement of the moving bodies 2 on the rail 1.

That is to say, when wind stream pushes the sail devices 3 rotatably mounted to the moving bodies 2, as the moving bodies 2 are moved on the rail 1, energy produced by movement of the moving bodies 2 is transferred to the generator 25 to permit electricity generation.

As described above, the rail 1 defines an endless loop which has, at both ends thereof, turnaround portions, to enable the moving bodies 2 to be repeatedly circulated thereon. Direction changing devices 4 are located at both turnaround portions of the rail 1, respectively. Each direction changing device 4 functions to change a direction, that is, an angle of sails 30. In this regard, it is to be noted that, as described above, the sail devices 3 are rotatably mounted to the moving bodies 2.

First support brackets are secured to a lower surface of and adjacent to both side ends of each moving body 2, and upper wheels 21 are respectively installed on the first support brackets in a manner such that they can be rotated on an upper surface of the rail 1. Second support brackets are secured to both side ends of each moving body 2, and lower wheels 22 are respectively installed on the second support brackets in a manner such that they can be rotated on a lower surface of the rail 1. In these ways, each moving body 2 is prevented from being overturned.

Figure 2:
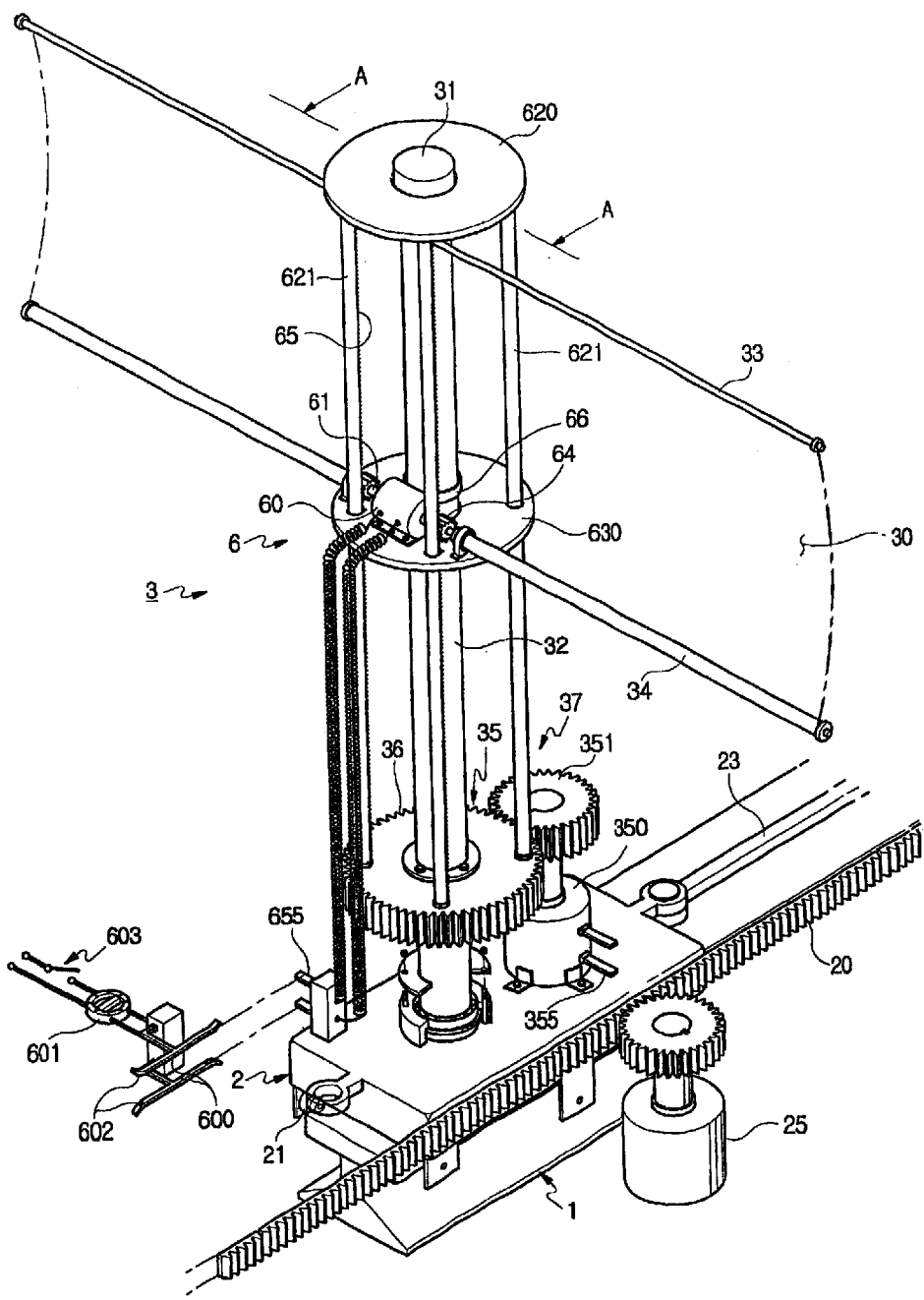
FIG. 2 is a perspective view illustrating a main part of the wind power generating system according to the present invention.
Figure 3:
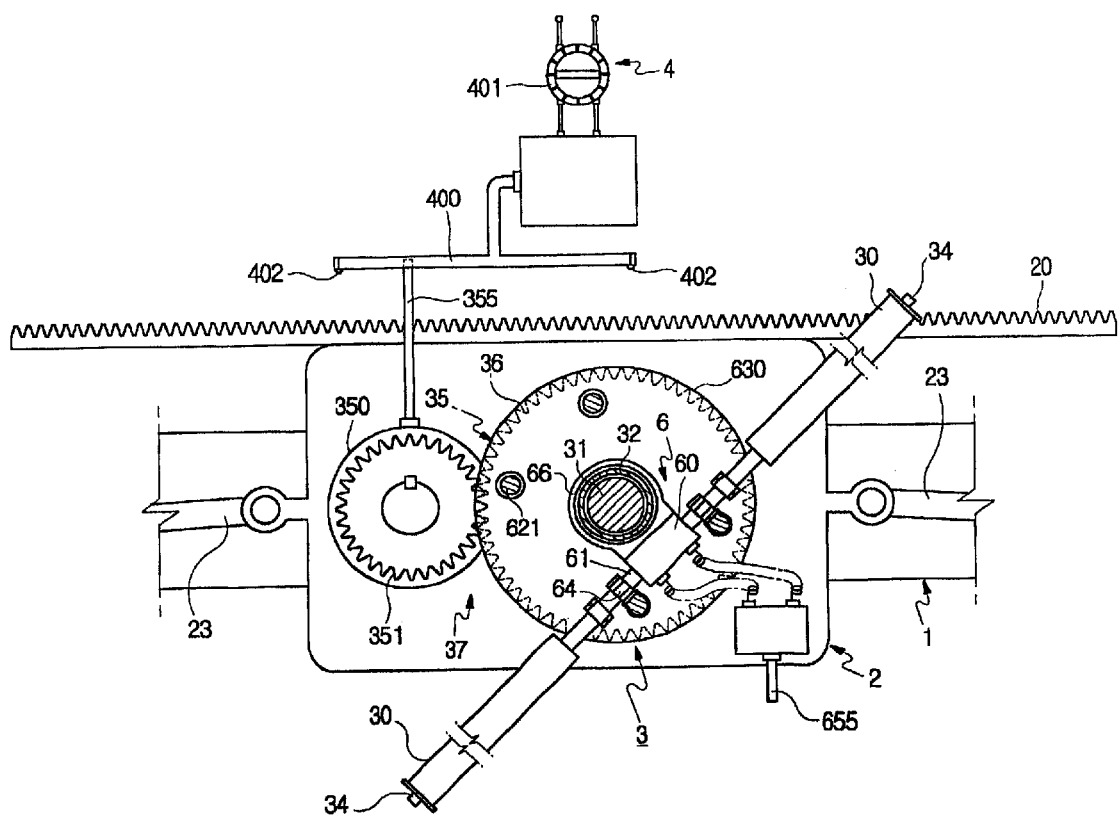
FIG. 3 is a transverse cross-sectional view illustrating a sail device of the wind power generating system according to the present invention.
Figure 4:
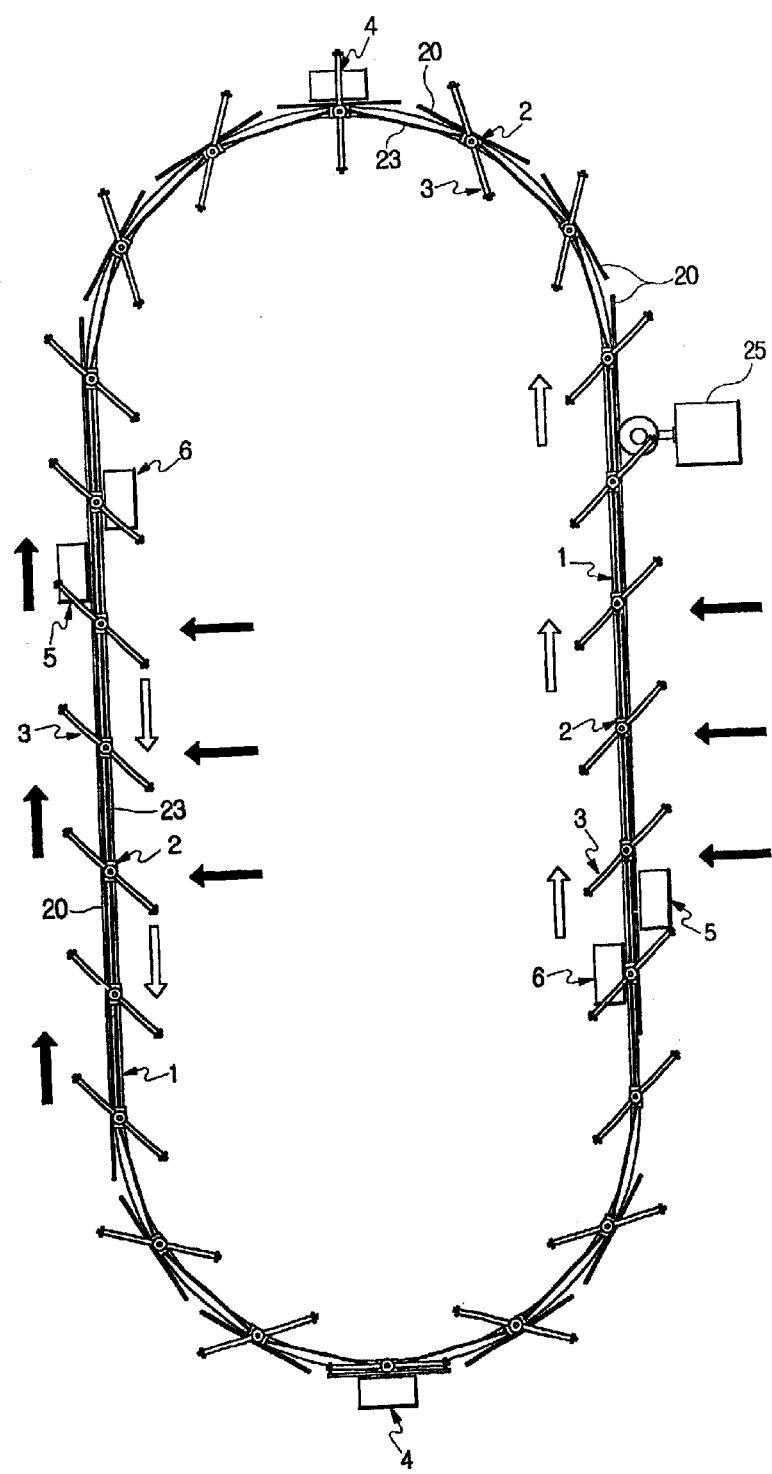
FIG. 4 is a plan view similar to FIG. 1, illustrating a state wherein directions of sails are changed.
Figure 5:
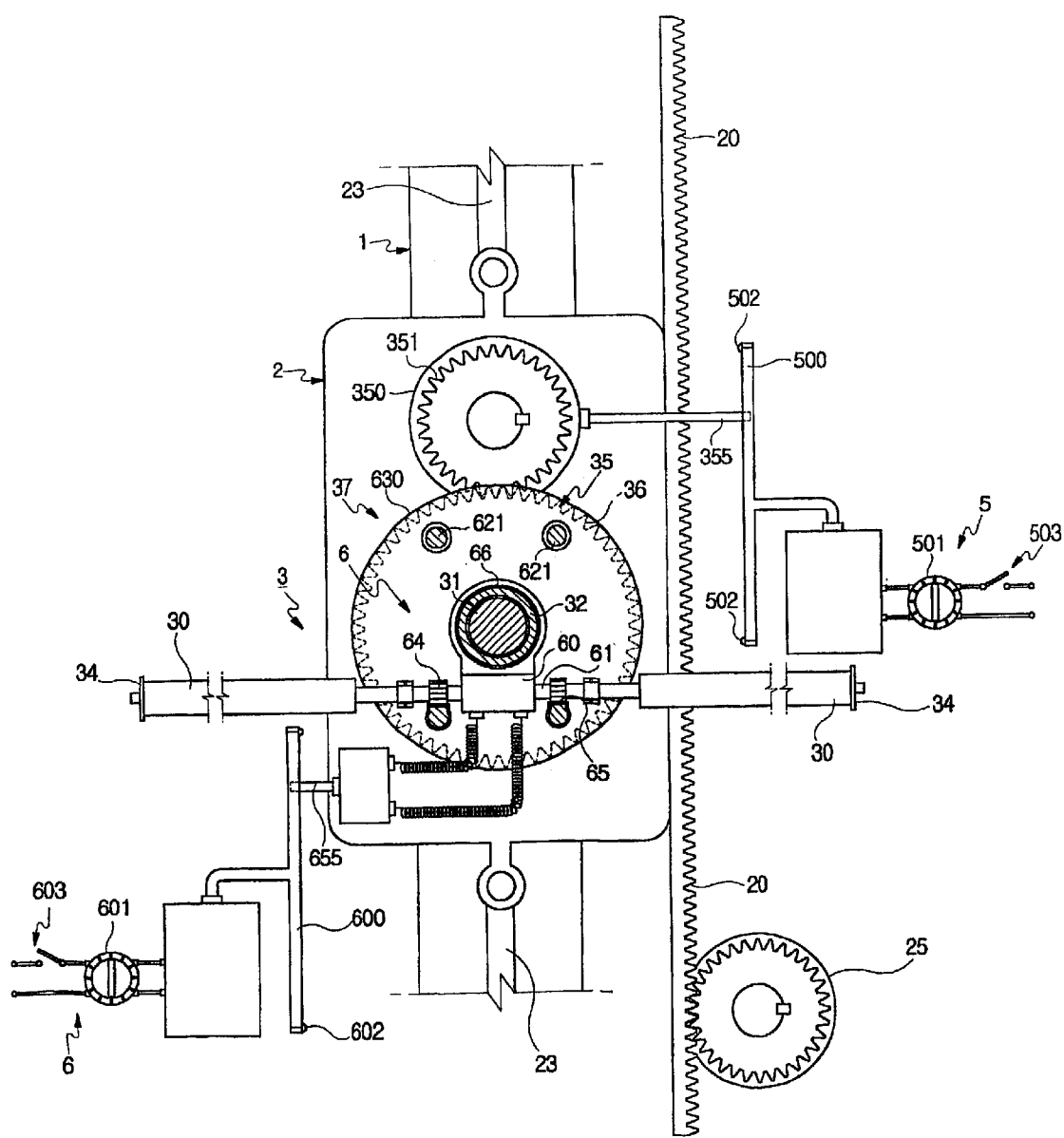
FIG. 5 is a transverse cross-sectional view illustrating a sail direction adjusting device of the wind power generating system according to the present invention.
Figure 6:
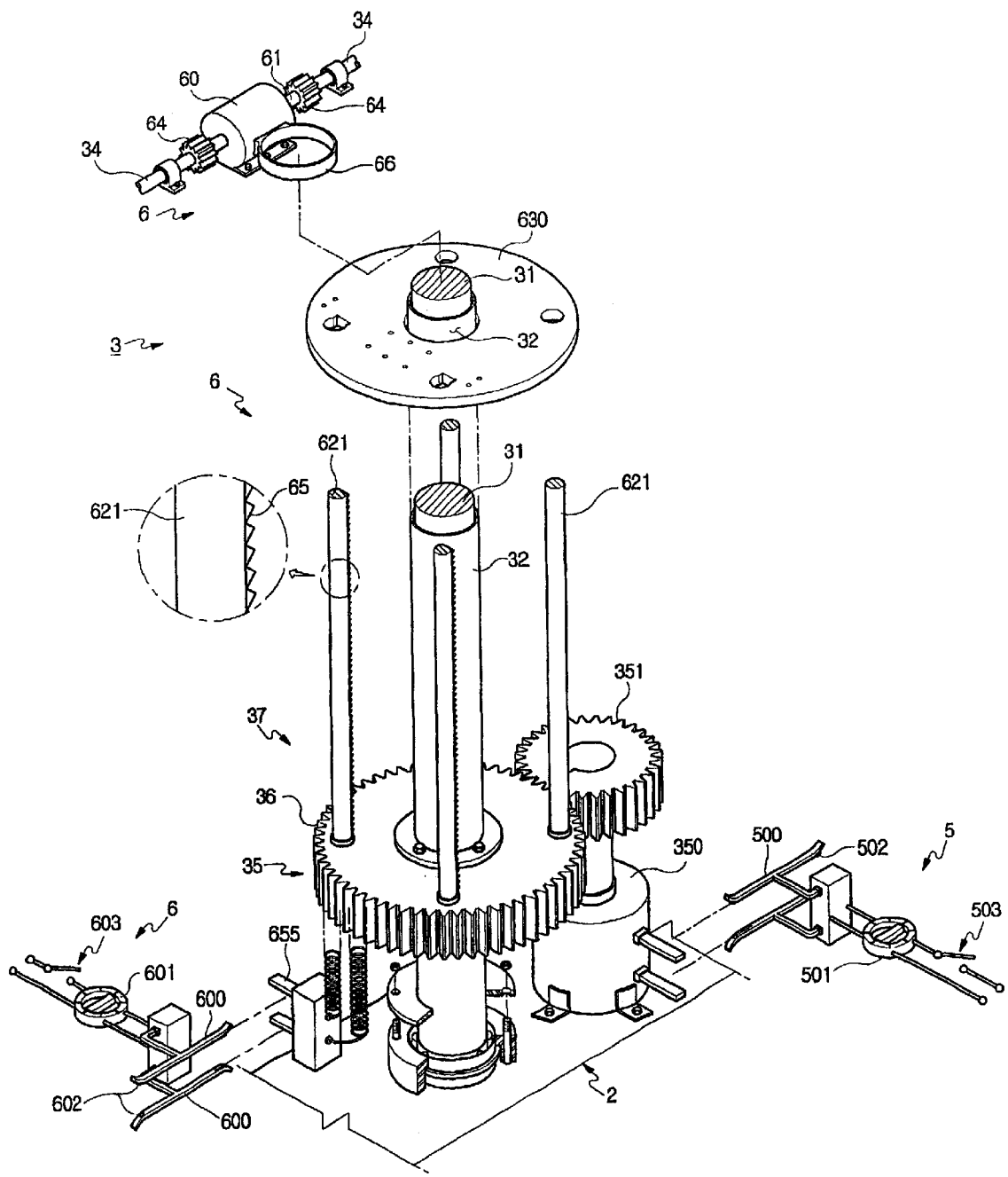
FIG. 6 is a perspective view illustrating a sail unfurling device of the wind power generating system according to the present invention.
Figure 7:
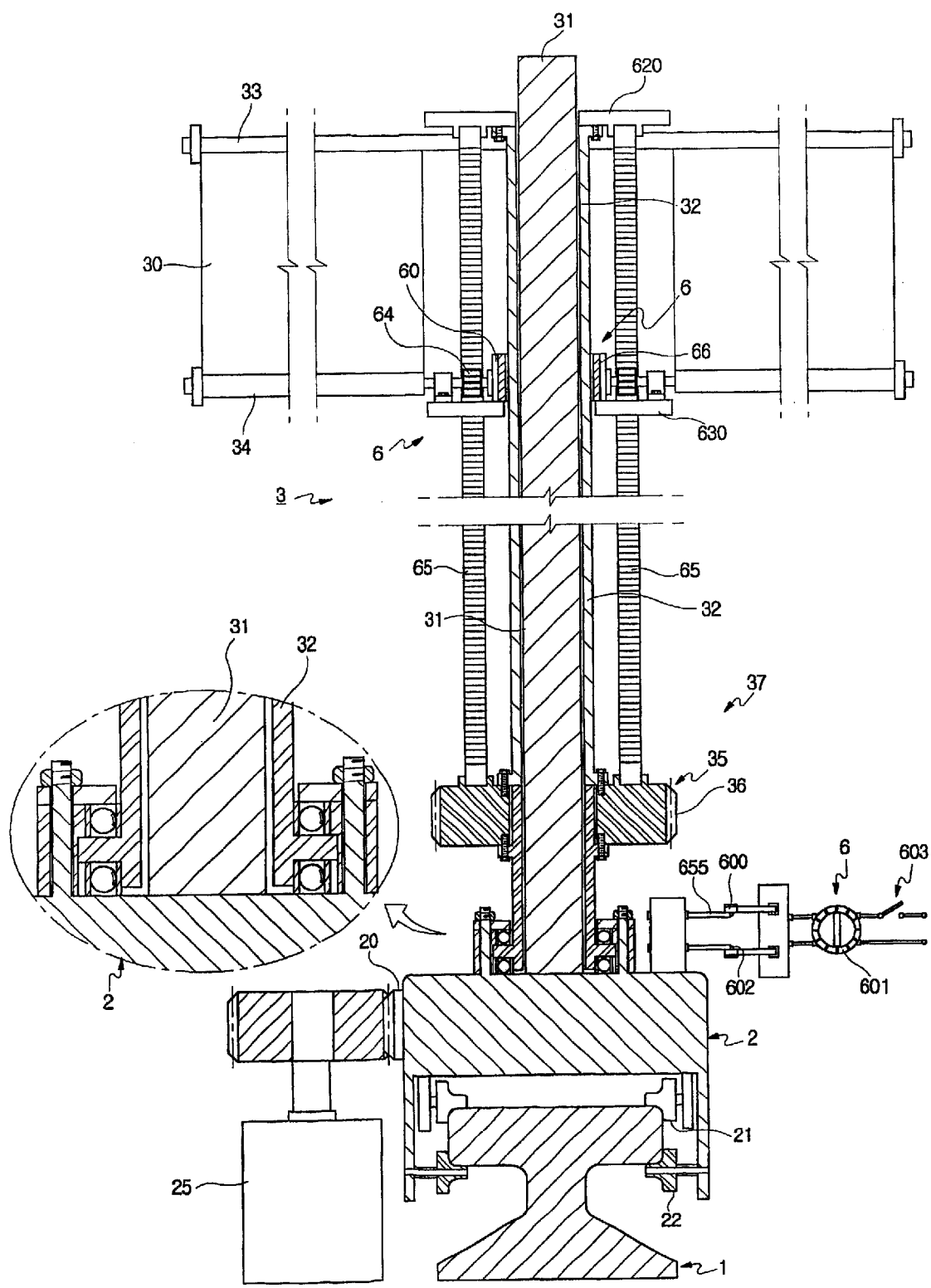
FIG. 7 is a cross-sectional view taken along the line A—A of FIG. 2.

As can be readily seen from FIGS. 2 and 3, each sail device 3 comprises a center shaft 31 vertically fastened to an upper surface of an associated moving body 2, a pipe-shaped mast 32 rotatably fitted around the center shaft 31, an upper transverse rod 33 secured to an upper end of the mast 32, a sail 30 fixed at an upper end thereof to the upper transverse rod 33, and a lower transverse rod 34 to which a lower end of the sail 30 is fixed.

A rotating mechanism 37 is provided to a lower end of each sail device 3. The rotating mechanism 37 has a rotation member 35 which is secured around the mast 32. The rotation member 35 is formed with gear teeth 36. The rotating mechanism 37 further has a first motor 350 which is fastened to the upper surface of the moving body 2 adjacent to the mast 32. A driving gear 351 which is formed on an output shaft of the first motor 350 is meshed with the gear teeth 36 of the rotation member 35. Thus, if the first motor 350 is actuated, the mast 32 can be rotated around the center shaft 31.

First terminals 355 for applying power to the first motor 350 are projectedly formed on a side of the first motor 350.

Each of the direction changing devices 4 located at both turnaround portions of the rail 1 comprises first contact terminals 400 arranged on a path along which the first terminals 355 of the first motor 350 are moved, to be brought into sliding contact with the first terminals 355, and a first timer 401 which is connected to the first contact terminals 400 to regulate a power supply time.

A pair of first sensors 402 are respectively installed on both ends of the first contact terminal 400 to sense the contact between the first terminal 355 and the first contact terminal 400 and thereby control operation of the first timer 401.

As the moving body 2 is moved, if the first terminals 355 of the first motor 350 are brought into sliding contact with the first contact terminals 400 of the direction changing device 4, one of the first sensors 402 senses the contact and operates the first timer 401, whereby power is supplied through the first contact terminals 400 to the first motor 350 for a predetermined time.

As power is supplied to the first motor 350, the first motor 350 is actuated. Then, as the driving gear 351 formed on the output shaft of the first motor 350 is rotated, the rotation member 35 secured around the mast 32 is also rotated. Hence, the mast 32 is rotated through the same revolutions as the first motor 350.

At the time when the first terminals 355 of the first motor 350 are freed from the first contact terminals 400, the first timer 401 is reset and ready to be brought again into sliding contact with first terminals 355 of a next moving body 2.

Due to the fact that the direction changing devices 4 for rotating the masts 32 are respectively located at both turnaround portions of the rail 1 as described above, the sails 30 which are moved along one direction are exposed to wind stream at their front surfaces to utilize a substantial portion of the wind stream, and remaining sails 30 which are moved along the other direction are exposed to wind stream at their side edges to minimize resistance to their movement.

Each direction changing device 4 functions to rotate the mast 32 by an angle of 90°. At this time, the rotation angle of the mast 32 can be adequately adjusted by the first timer 401 which regulates a power supply time to the first motor 350.

Since a direction of wind stream is continuously changed, it is necessary to appropriately adjust an angle of each sail 30.

To this end, the wind power generating system according to the present invention includes sail direction adjusting devices 5 which are located adjacent to the rail 1.

The sail direction adjusting device 5 is structured in substantially the same manner as the direction changing device 4.

That is to say, each sail direction adjusting device 5 comprises second contact terminals 500 arranged on the path along which the first terminals 355 of the first motor 350 are moved, to be brought into sliding contact with the first terminals 355, and a second timer 501 which is connected to the second contact terminals 500 to regulate a power supply time. A pair of second sensors 502 are respectively installed on both ends of the second contact terminal 500.

The only difference between the direction changing device 4 and the sail direction adjusting device 5 is that, in the sail direction adjusting device 5, in order to allow an operator to freely adjust a direction of a sail 30 in conformity with a direction of wind stream, an on/off switch 503 is placed on a line leading to the second timer 501.

Adjustment of a direction of a sail 30 in conformity with a direction of wind stream is implemented in a manner such that the operator acquires the direction of wind stream and calculates an angle through which the sail 30 must be rotated, the second timer 501 is set on the basis of the calculated angle, and then, the on/off switch 503 is turned on.

Thereafter, as the moving body 2 is moved, if the first terminals 355 of the first motor 350 are brought into sliding contact with the second contact terminals 500 of the sail direction adjusting device 5, one of the second sensors 502 senses the contact and operates the second timer 501, whereby power is supplied through the second contact terminals 500 to the first motor 350 for a preselected time to adjust the direction of the sail 30.

Wind stream is continuously changed not only in its direction but also in its intensity, that is, speed or flow rate.

Abrupt changes in a speed or flow rate of wind stream make it difficult to maintain a constant velocity of the moving bodies 2. If a velocity of the moving bodies 2 is not constantly maintained, electricity cannot be stably generated.

Irregular fluctuation in velocity of the moving bodies 2 adversely affects durability of the entire wind power generating system. In this sense, it is necessary to maintain a constant velocity of the moving bodies 2 even when a speed or flow rate of wind stream is changed.

To this end, the wind power generating system according to the present invention further includes sail unfurling devices 6. Each sail unfurling device 6 is installed on each sail device 3 to adjust, depending upon a change in speed or flow rate of wind stream, a degree to which the sail 30 is unfurled. Accordingly, it is possible to constantly maintain a velocity of the moving bodies 2.

As can be readily seen from attached drawings, each sail unfurling device 6 comprises a second motor 60. The second motor 60 is placed at a middle portion of the lower transverse rod 34 to which the lower end of the sail 30 is fixed, in a manner such that both ends of an output shaft 61 of the second motor 60 are integrally connected with the lower transverse rod 34. Thus, as the second motor 60 is actuated, the sail 30 can be furled around and unfurled from the lower transverse rod 34, and in this way, a degree to which the sail 30 is unfurled can be properly adjusted.

In order to allow a sail unfurling degree adjustment to be effected, the second motor 60 should be capable of being moved upward and downward as the sail 30 is furled around and unfurled from the lower transverse rod 34.

To this end, in the present invention, a reinforcing plate 620 is fastened to the upper end of the mast 32, and reinforcing columns 621 are securely positioned between the reinforcing plate 620 and an upper surface of the rotation member 35. A support plate 630 for supporting the second motor 60 is fitted around the mast 32 in a manner such that the reinforcing columns 621 pass through the support plate 630. The second motor 60 is fixedly seated on the support plate 630. A guide tube 66 which is coupled to a side of the second motor 60 is also fitted around the mast 32. As a consequence, when the sail 30 is furled around and unfurled from the lower transverse rod 34, the support plate 630 can be moved upward and downward along with the second motor 60 while being guided by the mast 32 and the reinforcing columns 621.

Pinion gears 64 are secured around both ends of the output shaft 61 of the second motor 60, which ends are integrally connected with the lower transverse rod 34 to which the lower end of the sail 30 is fixed. Rack gears 65 which are respectively meshed with the pinion gears 64 are formed on two of the reinforcing columns 621. By these provisions, it is possible to prevent the second motor 60 from being vibrated while being moved upward and downward.

A power supply device for supplying power to the second motor 60 comprises second terminals 655 installed on each moving body 2, third contact terminals 600 arranged on a path along which the second terminals 655 are moved, a third timer 601 which is connected to the third contact terminals 600 to regulate a power supply time to the third contact terminals 600, and a second on/off switch 603 for controlling power supply to the third timer 601.

Hereinafter, operations of the wind power generating system according to the present invention, constructed as mentioned above, will be described.

As wind stream pushes the sails 30, the moving bodies 2 on which the sails 30 are positioned are moved along the rail 1.

By the fact that the geared members 20 affixed to the moving bodies 2 are meshed with the gear of the generator 25, as the gear is rotated, the generator 25 generates electricity.

In other words, since the geared members 20 affixed to the moving bodies 2 are continuously meshed with the gear of the generator 25, as the gear is continuously rotated, the generator 25 generates electricity.

At one turnaround portion of the rail 1 which defines the endless loop, the moving bodies 2 should be changed in their direction to go against the wind stream.

At this time, a person skilled in the art will readily recognize that, when the sails 30 go against the wind stream, they should be minimally exposed to the wind steam to reduce resistance to their movement.

In order to ensure minimized exposure of the sails 30 to the wind stream, one of the direction changing devices 4 properly functions at one of the turnaround portions of the rail 1.

The sails 30 which pass through the direction changing devices 4 are rotated by an angle of 90°. Therefore, the sails 30 which are moved along the one direction are exposed to the wind stream at their front surfaces to utilize a substantial portion of the wind stream, and the remaining sails 30 which are moved along the other direction to go against the wind stream are exposed to the wind stream at their side edges to minimize resistance to their movement.

As apparent from the above description, the wind power generating system according to the present invention provides advantages in that it is configured to have improved durability and can steadily generate electricity even when a speed and a direction of wind stream are changed. Moreover, maintenance and repair for the wind power generating system can be conveniently performed.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A wind power generating system comprising:
   moving bodies connected one with another by connectors and repeatedly circulated on a rail of an endless track;
   sail devices rotatably mounted to the moving bodies and exposed to wind, each sail device having a sail and a mast and including a rotating mechanism for rotating the mast;
   geared members affixed to one sides of the moving bodies;
   a generator having a gear which is meshed with the geared members and thereby rotated to allow the generator to generate electricity;
   direction changing devices located at both turnaround portions of the rail; and
   sail direction adjusting devices each for adjusting a direction of the sail in conformity with a direction of wind stream.

2. The system as set forth in claim 1, wherein each sail device comprises a center shaft fastened to an upper surface of an associated moving body, a mast rotatably fitted around the center shaft, an upper transverse rod secured to an upper end of the mast, a sail fixed at an upper end thereof to the upper transverse rod, and a lower transverse rod to which a lower end of the sail is fixed.

3. The system as set forth in claim 1, wherein the system further comprises sail unfurling devices; and each sail unfurling device comprises a motor placed at a middle portion of the lower transverse rod in a manner such that both ends of an output shaft of the motor are integrally connected with the lower transverse rod, a support plate for supporting the motor, a guide tube fitted around the mast for ensuring that the support plate is moved upward and downward while being held horizontal, and reinforcing columns fastened to an upper surface of a rotation member, for preventing unintentional rotation of the support plate.

* * * * *